United States Patent [19]

Rawdon et al.

[11] Patent Number: 5,253,381
[45] Date of Patent: Oct. 19, 1993

[54] HINGED CARGO RAMP

[75] Inventors: Blaine K. Rawdon, Rancho Palos Verdes; Myles A. Rohrlick, Oceanside, both of Calif.

[73] Assignee: McDonnell Douglas Corporation, Long Beach, Calif.

[21] Appl. No.: 648,279

[22] Filed: Jan. 31, 1991

[51] Int. Cl.⁵ .................. B65G 67/00; B65G 49/00; E01D 15/00
[52] U.S. Cl. .................. 14/71.5; 14/71.7; 414/537
[58] Field of Search .......... 14/71.5, 71.7; 244/137; 414/537

[56] References Cited

U.S. PATENT DOCUMENTS

| | | | |
|---|---|---|---|
| 2,523,723 | 9/1950 | Santee et al. | 214/85 |
| 2,659,504 | 11/1953 | Kranawetvogel et al. | 214/318 |
| 3,147,942 | 9/1964 | Griffith | 244/137 |
| 3,799,479 | 3/1974 | Roeder et al. | 244/137 |
| 4,068,770 | 1/1978 | Boehringer | 214/85 |
| 4,235,399 | 11/1980 | Shorey | 244/137 |

Primary Examiner—Ramon S. Britts
Assistant Examiner—Nancy P. Connolly
Attorney, Agent, or Firm—Donald E. Stout; Gregory A. Cone; John P. Scholl

[57] ABSTRACT

A cargo ramp for an aircraft is constructed of two segments which are hinged together so that they may articulate about the ramp pitch axis. The first of the two segments is hinged to the cargo bed of the aircraft so that it may articulate relative to the cargo bed, again in pitch. The second segment abuts a surface to or from which cargo is to be transferred. The hinged ramp permits straight-across loading and unloading of cargo onto vehicles which have cargo bed heights different than the cargo bed height of the aircraft. In a modified embodiment, the ramp also compensates for a differential roll angle between the second ramp segment and the vehicle cargo bed. In this embodiment, the hinge connection between the two ramp segments permits relative motion of the second segment with respect to the first segment about its roll axis, as well as in pitch.

15 Claims, 3 Drawing Sheets

HINGED CARGO RAMP

BACKGROUND OF THE INVENTION

This application is related to applications Ser. No. 648,280, entitled "AIRCRAFT CARGO HANDLING SYSTEM", and Ser. No. 648,201, entitled "CARGO RAIL SYSTEM FOR AN AIRCRAFT", both filed on Jan. 31, 1991.

This invention relates to cargo ramps, and more particularly to a segmented and hinged cargo ramp suitable for moving cargo into and out of the fuselage of an aircraft.

Cargo aircraft today, and more particularly military cargo aircraft, employ a cargo ramp for loading cargo into or unloading cargo from the aircraft cargo bay. Typically, the cargo ramp is of a single piece design which is attached at its forward end to the cargo bed by means of a hinge. During flight operations, it is stowed and latched in such a manner that it serves as the cargo hatch door. For ground operations, the ramp is unlatched and allowed to swing downwardly on its hinge until the end contacts the ground, at which point the ramp is ready for use, bridging the cargo bed and the ground. For loading or unloading vehicles into or out of the cargo bay, a ramp toe is typically used, which allows the vehicles to easily drive onto or off of the ramp.

Most cargo other than actual vehicles is palletized for easier transport, being secured to a standard military pallet. When unloading palletized cargo, the pallets must first be moved down the ramp onto the ground, then reloaded onto ground vehicles such as trucks for transport to their final destination. Forklifts are typically used for reloading the pallets onto the trucks. This is a slow, labor-intensive process, involving much manpower and extensive use of costly and sometimes scarce ground support equipment. This is a particular problem when operations are being conducted on remote austere airfields, where the necessary ground support equipment may be completely unavailable.

The obvious solution to this problem is to place the ramp directly between the aircraft cargo bed and the truck bed, so that the cargo need not be off-loaded onto the ground and then reloaded onto the truck bed, or vice-versa. However, this solution will not work well unless the cargo bed and the truck bed are at the same height. If the truck bed is significantly higher than the aircraft cargo bed, there will be a vertical gap between the end of the ramp and truck bed. If the aircraft cargo bed is significantly higher than the truck bed, the end of the cargo ramp will be sharply angled into the bed of the truck. In either case, transfer of the cargo will be difficult or impossible.

Prior art approaches to this problem have not been particularly successful or desirable. One approach is to employ variable extension landing gear on the aircraft. When loading or unloading is to commence, the landing gear is actuated to raise or lower the aircraft so that the aircraft cargo bed and the truck bed are the same height. Needless to say, variable extension landing gear is very expensive, bulky, heavy, and is also quite slow in operation. Another approach is to standardize truck bed heights and aircraft cargo bed heights. Such an approach is very expensive to implement and necessarily involves design compromises and tradeoffs in either the aircraft or truck designs or both. Furthermore, it would take years to get enough standardized aircraft and trucks in service to make a real difference. What is needed is a simple, compact, inexpensive, and lightweight device which will permit straight-across loading and unloading of cargo onto vehicles which have cargo bed heights different than the cargo bed height of the aircraft.

SUMMARY OF THE INVENTION

This invention solves the problem outlined above by utilizing a segmented and hinged cargo ramp for ensuring straight across loading and unloading of cargo between two surfaces of different heights. The ramp has a length along which the cargo travels, and a width, and comprises a first ramp section and a second ramp section. The aft end of the first ramp section is attached to the forward end of the second ramp section by means of a first hinge. The forward end of the first ramp section is attached to a first of the two surfaces, typically an aircraft cargo bed, by means of a second hinge. The ramp has first and second pitch axes oriented generally across its width and the first hinge permits relative motion between the first ramp section and the second ramp section in pitch substantially about the first pitch axis. The second hinge connecting the first ramp section and the aircraft cargo bed is conventional. It has a hinge line parallel to the first pitch axis which comprises the second pitch axis and permits relative motion of the first ramp section with respect to the aircraft cargo bed substantially about the hinge-line of the second hinge in pitch. The cargo ramp serves as the cargo hatch door during flight. A first actuator means, comprising at least two actuators, controls the motion of the first ramp section, while a second actuator means, again comprising at least two actuators, controls the motion of the second ramp section. Each actuator is attached at one end to the aircraft fuselage. The actuators comprising the first actuator means are attached at their other end to the first ramp section, while the actuators comprising the second actuator means are attached at their other end to the second ramp section. Each actuator means is controllable independently of the other to permit relative motion of the first and second ramp sections. All of the actuators for the first actuator means operate in parallel, as do all of the actuators for the second actuator means, in order to efficiently move their respective ramp sections in pitch with respect to one another and the two surfaces.

A modified embodiment permits a matching of the second ramp section and the second surface (typically a truck cargo bed) when there is a differential roll angle between them. The first hinge permits relative motion in both pitch and roll between the first and second ramp sections, so that the second ramp section may be rotated about its roll axis, which is oriented generally along the length of the ramp, until it is at the same roll angle as the second surface.

In operation, to transfer an article from the first surface to the second surface, the ramp sections are first aligned horizontally. Next, the article is moved to the second ramp section. Following this, the second ramp sect on is moved in pitch until it is in horizontal alignment with the second surface, with the first ramp section being sloped upwardly or downwardly as necessary from the first surface to the second ramp section. If there is a differential roll angle between the second ramp section and the second surface, the second ramp section is then rotated about its roll axis until there is substantially no roll angle differential between the second ramp section and the second surface.

Therefore, it is an object of this invention to provide a simple, compact, inexpensive and lightweight device which will provide for straight-across loading and unloading of cargo onto vehicles which have cargo floor heights different than that of the aircraft.

It is also an object of this invention to provide a cargo ramp device which serves the function of a cargo door when in its stowed position.

The above mentioned and other objects and features of this invention and the manner of attaining them will become apparent, and the invention itself will be best understood, by reference to the following description taken in conjunction with the accompanying illustrative drawings.

DETAILED DESCRIPTION OF THE DRAWINGS

Figure 1:
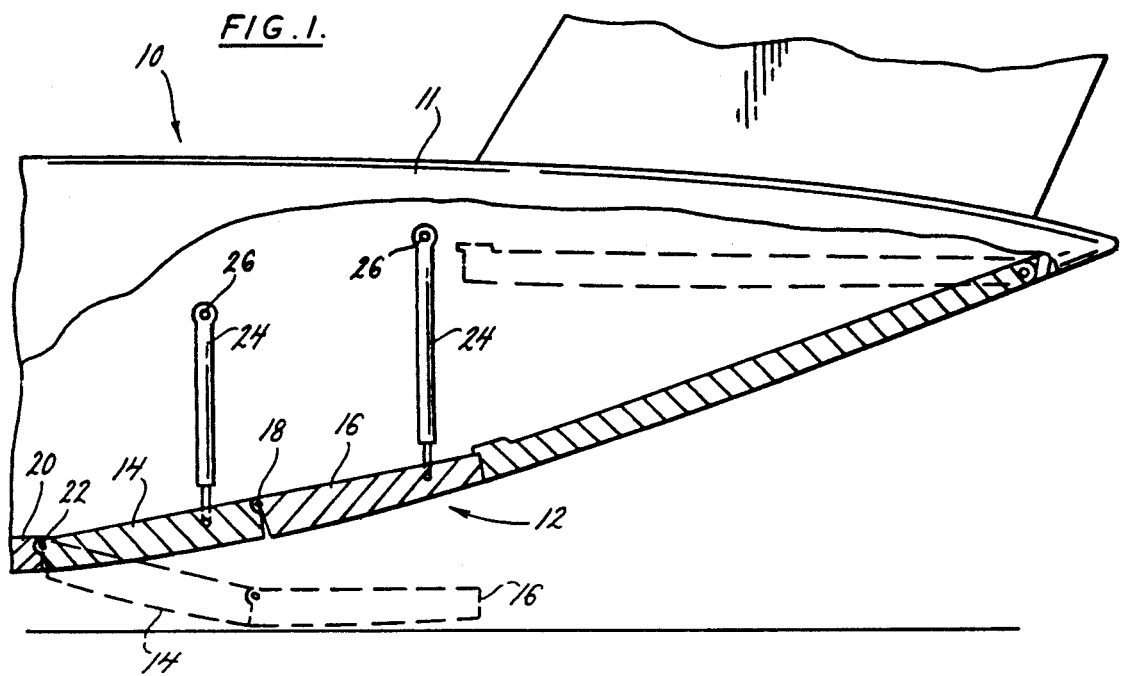
FIG. 1 is an elevational view showing the aft end of a cargo aircraft outfitted with the double-hinged cargo ramp of the invention.
Figure 2:
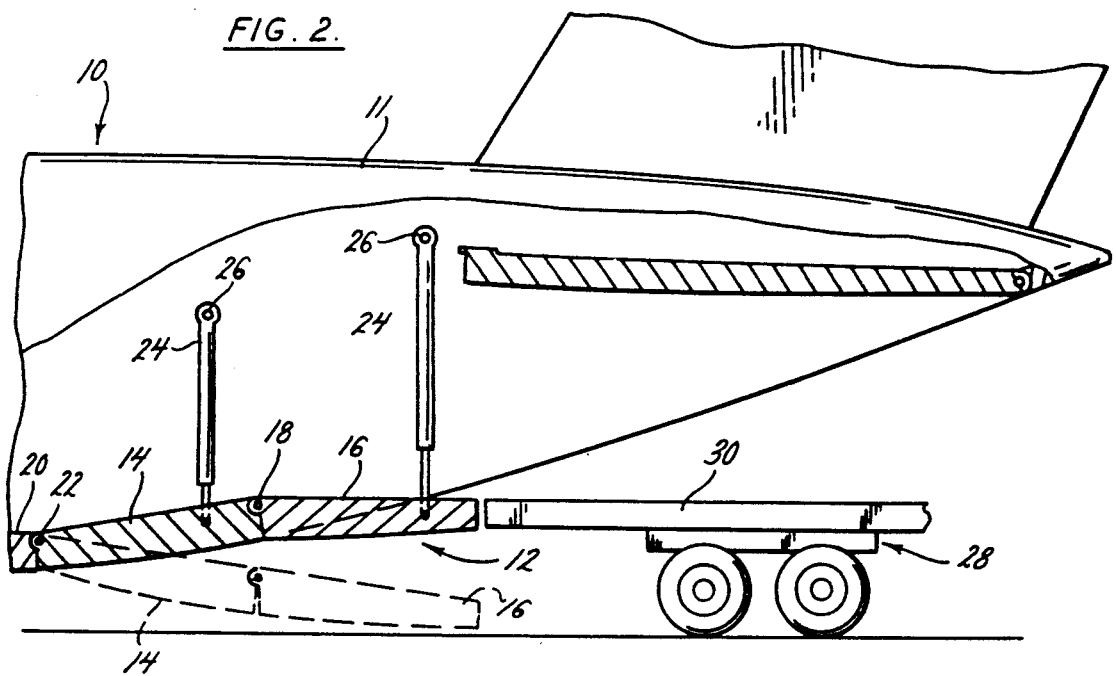
FIG. 2 is an elevational view similar to FIG. 1, showing the cargo ramp configured to permit cargo transfer between the aircraft cargo bed and a truck bed.
Figure 3:
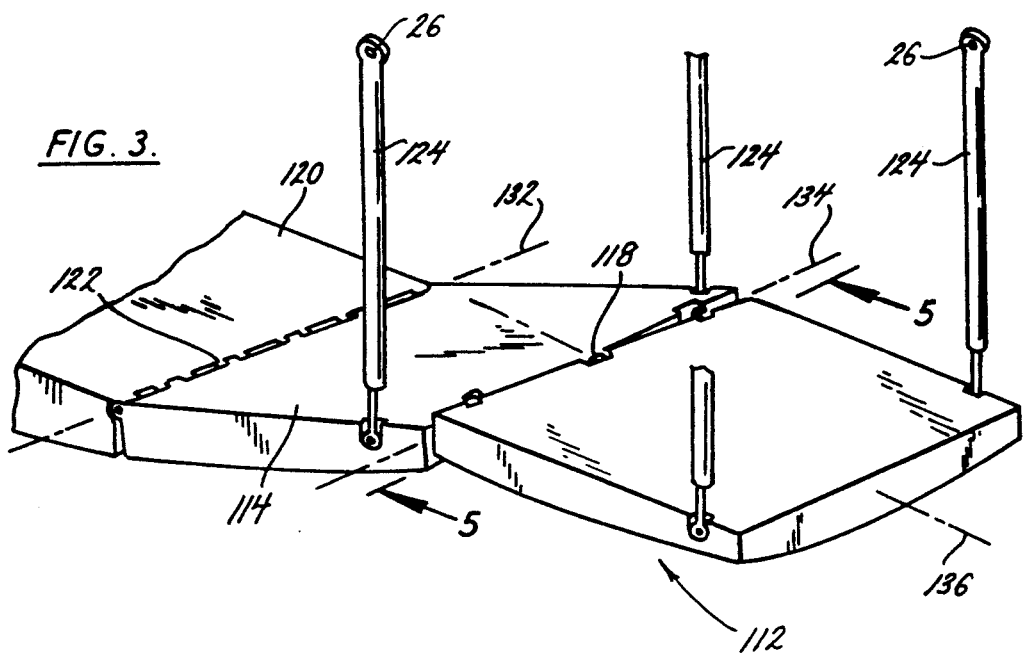
FIG. 3 is a diagrammatic perspective view showing a modified triple-hinged embodiment of the inventive cargo ramp.
Figure 4:
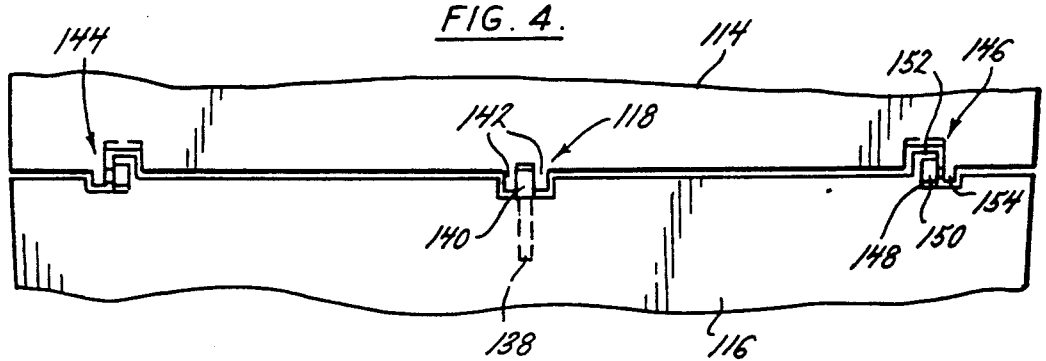
FIG. 4 is a diagrammatic top view of the joint between ramp sections of the FIG. 3 embodiment, showing a modified hinge permitting relative motion along two axes between ramp sections.

Referring now to the drawings, FIGS. 1 and 2 show a cargo aircraft 10 having a fuselage 11 and a cargo ramp 12 constructed according to the invention. Cargo ramp 12 comprises a first forward ramp section 14 and a second aft ramp section 16 which are connected by means of a first hinge 18 so that they may be articulated with respect to one another. The ramp sections each comprise a substantially solid platform, and are sized so that a standard military cargo pallet may be entirely accommodated on one ramp section. Forward ramp section 14 is connected to cargo bed 20 of the aircraft by means of a second hinge 22. Actuators 24 serve to move the ramp 12 into its desired configuration. Preferably, there are four actuators 24, as shown in FIG. 3, with two actuators being mounted to each ramp section 14, 16 and each one being attached to the fuselage 11 of the aircraft at attachment points 26, by any conventional means. Motion of each ramp section 14, 16 is thereby controlled by a pair of actuators 24. The pair of actuators for ramp section 14 always move in concert with one another, moving the same amount and direction, as do the pair of actuators for ramp section 16. The actuators preferably are pneumatic actuators of a known type, but may also comprise any other known type of actuator, such as hydraulic actuators. Of course, a different number of actuators could be employed, depending upon the desired relative motion between the two ramp sections and weighed against relative cost and weight factors.

In operation, during flight the ramp 12 would be stowed and latched in a conventional fashion, as shown in FIG. 1 in solid outline. This is the "normal-stowed" configuration, in which the ramp serves as the cargo hatch door. For ground operations, articulated ramp sections 14 and 16 may be actuated into a variety of configurations, depending upon available equipment at the airfield where loading or unloading is to take place, and what type of cargo is being loaded or unloaded. When loading or unloading vehicles, such as tanks, a "normal straight ramp" configuration could be used, with the two ramp sections 14, 16 aligned and sloped toward the ground like a conventional ramp. This configuration is shown in phantom outline in FIG. 2, and would preferably employ a conventional ramp toe (not shown). During cargo loading directly to or from vehicles, such as truck 28 shown in FIG. 2, the ramp sections would be configured as shown in solid outline in that figure, with the aft ramp being at the same height as and coplanar with the truck bed 30. Other configurations are possible, such as the configuration shown in phantom outline in FIG. 1, wherein the forward ramp section 14 is sloped toward the ground and the aft ramp section 16 is flat on the ground.

A great advantage of the inventive cargo ramp system is in its versatility in allowing for efficient loading and unloading operations at austere airfields without use of ground support equipment. The actuators 24 are controlled by the aircraft loadmaster with a semi-automated system which incorporates a simple control such as a joystick having several common preset positions such as "normal-stowed" or "normal straight". For loading operations directly from truck 28 to the aircraft, the loadmaster would first set the ramp sections so that the aft section 16 was at the same height as and coplanar with the truck bed 30. Unless the truck bed was exactly the same height as the cargo floor, forward section 14 would probably be sloped up or down to achieve this matching. The cargo, most typically a standard military pallet, would then be moved to the aft ramp section 16. Then the aft ramp section 16 would be straightened out so that the forward and aft ramp sections 14, 16 were in a "full-flat" configuration and the cargo would be moved onto the aircraft. To unload cargo from the aircraft to the truck 28, the ramp sections 14, 16 would first be set to the "full-flat" configuration. Then, the cargo would be off-loaded onto the aft ramp section 16. Following this, the aft ramp section 16 would be raised or lowered so that it was at the same height and coplanar with the ground vehicle bed, at which point the cargo could be moved onto the ground vehicle.

One problem which could be encountered on uneven terrain, such terrain being likely at a remote airfield, would be the chance that the ground vehicle bed would be at a different "roll" angle than the aircraft. Such a roll angle differential, if substantial, could present problems in aligning the ramp with the vehicle bed, thus making the cargo loading or unloading operation difficult or impossible. One method of solving this problem would be to employ main landing gear on the aircraft 10 which would be capable of differential pneumatic jacking. With such a system, either the right or left side landing gear would be pneumatically jacked to a height greater than that of the other one, so that the aircraft cargo bed would match that of the truck 28. Such variable extension landing gear systems are known and in use today, in, for example, the C-5 military cargo aircraft, manufactured by Lockheed Corporation.

An even better method of solving the problem of roll angle differential is illustrated in the modified embodiment of FIGS. 3-8. This embodiment eliminates the need for a variable extension landing gear, thus eliminating cost, complexity, and weight from the aircraft. Viewing FIG. 3, a cargo ramp 112 is shown which is very similar to that of the embodiment of FIGS. 1-2. The ramp 112 is comprised of a first forward ramp section 114 and a second aft ramp section 116. Ramp sections 114 and 116 are attached to one another by means of a first hinge 118. Forward ramp section 114 is also attached to aircraft cargo bed 120 by means of a second hinge 122, which allows relative motion of the forward ramp section 114 with respect to the cargo bed 122 about the hinge-line 132 of hinge 120. Hinge-line 132 is parallel to a first pitch axis 134 of the ramp 112, and essentially comprises a second pitch axis. Hinge 118 is the only component in the FIG. 3 embodiment which is different than its counterpart in the embodiment of FIG. 1. It allows for relative motion between forward ramp section 114 and aft ramp section 116 in two degrees of freedom. Relative motion is permitted about both the first pitch axis 134 of the ramp 112 and the roll axis 136 of the aft ramp section 116. Actuators 124 work as discussed with respect to the FIG. 1 embodiment, with two actuators attached to each ramp section. The forward ramp section actuators work in parallel as in the first embodiment. The aft ramp section actuators work in parallel to control the aft ramp section pitch angle, but work differentially to control the aft ramp section roll angle.

Details of the preferred hinge 118 are shown in FIGS. 4-8, although one of ordinary skill in the art could employ other known hinge arrangements for obtaining relative motion with two degrees of freedom without exceeding the scope of this invention. Viewing FIGS. 4, 5, and 6, it can be seen that the hinge 1 18 includes a spindle bearing, comprised of a shaft 138 extending from aft ramp section 116 and sleeved onto spindle 140. Spindle 140, in turn, is rotatably mounted within fingers 142, which extend from forward ramp section 114, such that each end of the spindle 140 is inserted into an aperture in one of the fingers. Sufficient clearance is provided between the outside diameter of the spindle 140 and the inside diameter of each respective aperture in fingers 142 that the spindle is free to rotate, thus permitting rotation of shaft 138 and aft ramp section 116 about the pitch axis 134.

Figure 5:
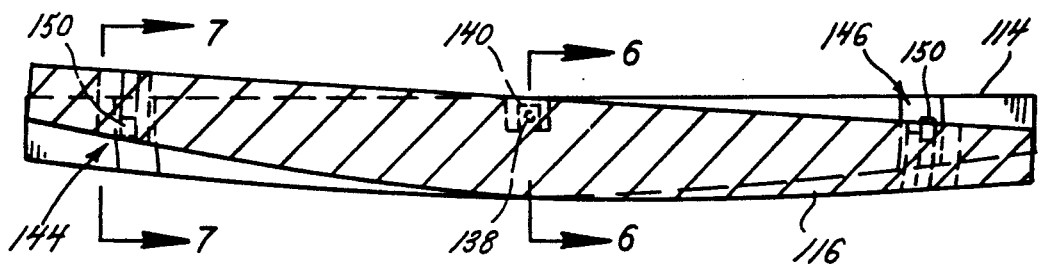
FIG. 5 is a cross-sectional view taken along line 5—5 of FIG. 3, showing further details of the modified hinge.
Figure 6:
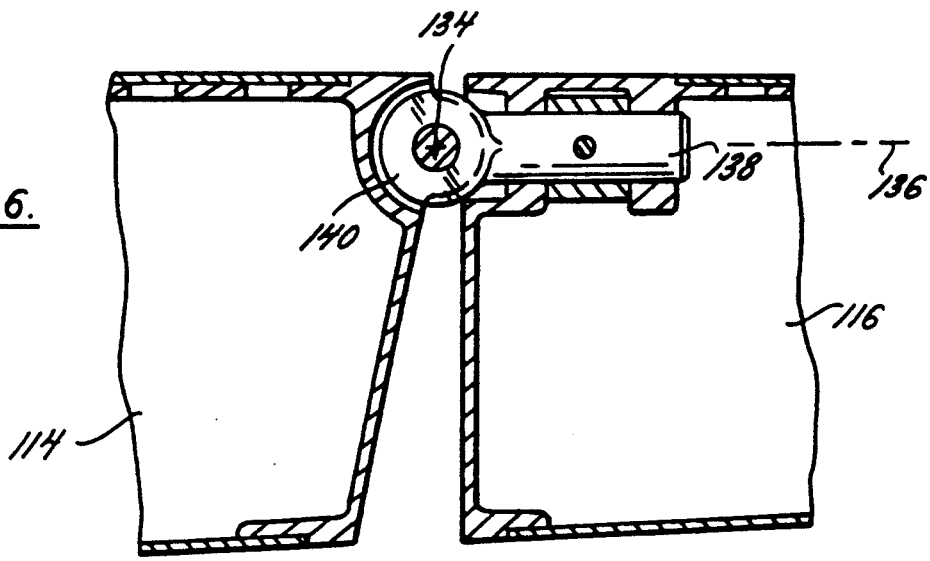
FIG. 6 is a cross-sectional view taken along line 6—6 of FIG. 5.
Figure 7:
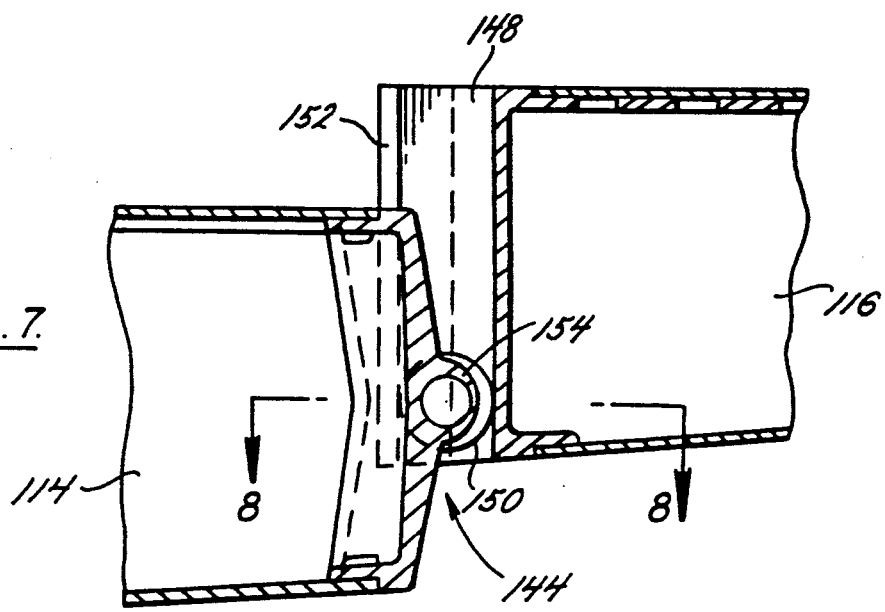
FIG. 7 is a cross-sectional view taken along line 7—7 of FIG. 5.
Figure 8:
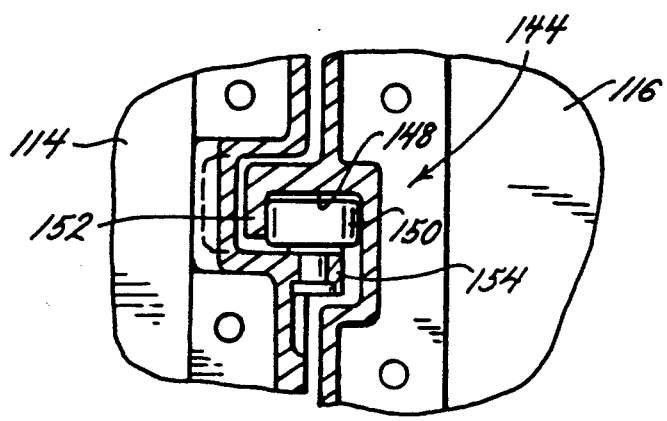
FIG. 8 is a cross-sectional view taken along line 8—8 of FIG. 7.

Relative motion of aft ramp section 116 about the roll axis 136 is accommodated by channel rollers 144 and 146, as shown in FIGS. 4, 5, 7, and 8. Channel rollers 144 and 146 each comprise a channel 148, which is formed by a first lip 152 on the forward end of aft ramp section 116. A roller 150 is mounted on a second lip 154 on the aft end of forward ramp section 114, in such a manner as to travel vertically along the channel 148. Preferably, the channel 148 is curved as shown in FIG. 5, forming an arc about the point of intersection between roll axis 136 and the spindle 140. Of course, other equivalent means for obtaining relative rotation of the aft ramp section in both pitch and roll may occur to one of ordinary skill in the art without exceeding the scope of the invention.

In operation, for unloading the aircraft 10 onto a truck bed 30, the truck bed 30 being misaligned in roll with the cargo bed 120, the aircraft loadmaster would first configure the ramp in the "full-flat" position, with the cargo bed and both ramp sections all in horizontal alignment. The cargo would then be moved to the aft ramp. Following this, the aft ramp section 116 would be raised to be level with the truck bed and at the same pitch angle. The two aft ramp section actuators 124 would be operated in parallel to perform this function. Finally, the aft ramp section would be rolled about roll axis 136 on shaft 138 by operating the two actuators differentially until the aft section was at the same roll angle as the truck bed 130. At this point, the cargo would be moved from the aft ramp section to the truck bed. The channel rollers 144 and 146 permit the change in relative roll angle between the forward and aft ramp sections by allowing the rollers 150 to move along the channels 148 as the aft ramp section is rotated, as shown in FIG. 5. To load the aircraft from a truck bed 30, the steps above would be performed in reverse order.

Although an exemplary embodiment of the invention has been shown and described, many changes, modifications, and substitutions may be made by one having ordinary skill in the art without departing from the spirit and scope of the invention.

We claim:

1. A ramp, having a length and a width, for conveying articles between two surfaces, said ramp having first and second pitch axes oriented generally across said width and a roll axis oriented generally along said length and comprising:
    a first ramp section having a forward end and an aft end;
    a second ramp section having a forward end and an aft end;
    a first hinge means attaching said first ramp section aft end to said second ramp section forward end and permitting relative motion of said ramp sections substantially about the first pitch axis in pitch and substantially about the roll axis in roll;
    a second hinge means on said forward end of said first ramp section which is adapted for hingedly attaching said first ramp section to a first of said two surfaces;
    said aft end of said second ramp section being adapted for substantial abutment with a second of said two surfaces;
    said second hinge means having a hinge-line which comprises the second pitch axis, said second pitch axis being substantially parallel to said first pitch axis, the second having means permitting relative motion of said first ramp section and said first surface substantially about said hinge-line in pitch.

2. The ramp as recited in claim 1, wherein said first surface is an aircraft cargo bed.

3. The ramp as recited in claim 2, wherein said second surface is either a vehicle cargo bed or the ground.

4. The ramp as recited in claim 1, and further comprising:
    a first actuator means for controlling motion of said first ramp section;
    a second actuator means for controlling motion of said second ramp section;
    said first and second actuator means being controllable independently of one another to permit relative motion of said first and second ramp sections in order to obtain a desired configuration of said ramp between said first and second surfaces.

5. The ramp as recited in claim 4, wherein said first actuator means further comprises:
   at least two actuators, said actuators being attached to said first ramp section;
   said at least two actuators operating in parallel to move said first ramp section in pitch with respect to said first surface and said second ramp section.

6. The ramp as recited in claim 5, wherein said second actuator means further comprises:
   at least two actuators, said actuators being attached to said second ramp section;
   said at least tow actuators of said second actuate means operating in parallel to move said second ram section in pitch with respect to said first ramp section and said second surface, and operating differentially to move said second ramp section in roll with respect to said first ramp section and said second surface.

7. A cargo ramp for an aircraft or the like, said aircraft having a cargo bed for storing cargo during flight and further having a fuselage, said cargo bed being accessible through a hatch opening in said fuselage, said cargo ramp having a pitch axis and comprising:
   a first ramp section having a forward end and an aft end;
   a second ramp section having a forward end and an aft end, said aft end of said second ramp section being adapted for substantial abutment with either a vehicle cargo bed or the ground;
   a first hinge means attaching said first ramp section aft end to said second ramp section forward end and permitting articulation of said first and second ramp sections with respect to one another in pitch;
   a second hinge means on said forward end of said first ramp section and adapted for hingedly attaching said first ramp section to said cargo bed, said second hinge means having a hinge-line parallel to said ramp pitch axis and permitting articulation of said first ramp section with respect to said cargo bed in pitch;
   a first actuator means for controlling motion of said first ramp section; and
   a second actuator means for controlling motion of said second ramp section;
   said first and second actuator means being controllable independently of one another to permit relative motion of said first and second ramp sections in order to obtain a desired configuration of said ramp between said aircraft cargo bed and said vehicle cargo bed or the ground.

8. The cargo ramp as recited in claim 7, wherein said cargo ramp is stowed during flight in such a manner as to cover said cargo hatch, serving as said cargo hatch door.

9. The cargo ramp as recited in claim 7, wherein said first actuator means further comprises:
   at least two actuators, said actuators being attached at a first end to said first ramp section;
   said at least two actuators operating in parallel to move said first ramp section in pitch with respect to said aircraft cargo bed and said second ramp section.

10. The cargo ramp as recited in claim 9, wherein said second actuator means further comprises:
   at least two actuators, said actuators being attached at a first end to said second ramp section;
   said at least two actuators operating in parallel to move said second ramp section in pitch with respect to said first ramp section and said vehicle cargo bed or the ground.

11. The cargo ramp as recited in claim 10, wherein the actuators of said first and second actuator means are attached at a second end to said fuselage.

12. A cargo ramp for an aircraft or the like, having a length and a width, said aircraft having a cargo bed for storing cargo during flight and further having a fuselage, said cargo bed being accessible through a hatch opening in said fuselage, said cargo ramp having a pitch axis oriented generally across said width and comprising:
   a first ramp section having a forward end and an aft end;
   a second ramp section having a forward end and an aft end, said aft end of said second ramp section being adapted for substantial abutment with either a vehicle cargo bed or the ground;
   a first hinge means attaching said first ramp section aft end to said second ramp section forward end and permitting articulation of said first and second ramp sections with respect to one another substantially about the pitch axis in pitch; and
   a second hinge means on said forward end of said first ramp section and adapted for hingedly attaching said first ramp section to said cargo bed, said second hinge means having a hinge-like parallel to said ramp pitch axis and permitting articulation of said first ramp section with respect to said cargo bed substantially about said hinge-line in pitch;
   wherein said second ramp section has a roll axis oriented generally along its length, said first hinge means permitting relative motion between said first and second ramp sections in both pitch and roll.

13. The cargo ramp as recited in claim 7, said first and second ramp sections each comprising a substantially solid platform, each said ramp section platform being sized so that a standard military cargo pallet may be entirely accommodated thereon.

14. A method of transferring an article between a first surface and a second surface, said articles being conveyed from said first surface to said second surface across a ramp, said ramp having first and second pitch axes lying generally widthwise thereon and substantially parallel to one another, and comprising a first ramp section having a forward end and an aft end and a second ramp section having a forward end and an aft end, the forward end of said first ramp section being adapted for hinged attachment to said first surface, the aft end of said second ramp section being adapted for substantial abutment with said second surface, said first and second ramp sections being hingedly attached to one another, said second ramp section having a roll axis lying generally lengthwise thereon, said method comprising:
   moving said first and second ramp sections substantially about the first pitch axis to a position where said first and second ramp sections and said first surface are in horizontal alignment;
   transferring said article from said first surface across said first ramp section and onto said second ramp section;
   moving said second ramp section substantially about the second pitch axis until it is in horizontal alignment with said second surface, said first ramp section being sloped upwardly or downwardly as necessary from said first surface to said second ramp section.

15. The method of claim 14, further comprising the step of rotating the second ramp section about its roll axis until there is substantially no roll angle differential between said second ramp section and said second surface.

* * * * *